United States Patent

Nakashima et al.

[19]

[11] Patent Number: 5,869,943
[45] Date of Patent: Feb. 9, 1999

[54] VEHICLE MOTION CONTROL SYSTEM

[75] Inventors: Hiroshi Nakashima, Nishio; Toshiaki Hamada, Okazaki; Jun Mihara, Toyoake; Hitoshi Terada, Nishio, all of Japan

[73] Assignee: Aisin Seiki Kabushiki Kaisha, Kariya, Japan

[21] Appl. No.: 967,329

[22] Filed: Oct. 21, 1997

[30] Foreign Application Priority Data

Oct. 23, 1996 [JP] Japan ..................................... 8-299660

[51] Int. Cl.$^6$ ................................................ B64C 13/18
[52] U.S. Cl. ......................... 318/586; 303/146; 701/70; 701/82; 701/83; 318/587
[58] Field of Search ..................... 364/426, 424, 364/426.01; 303/100, 146; 701/82, 70, 183

[56] References Cited

U.S. PATENT DOCUMENTS

| | | | |
|---|---|---|---|
| 4,917,444 | 4/1990 | Ishido et al. | 303/100 |
| 5,019,984 | 5/1991 | Masaki et al. | 364/426 |
| 5,645,326 | 7/1997 | Sano | 303/146 |
| 5,671,982 | 9/1997 | Wanke | 303/146 |
| 5,691,900 | 11/1997 | Luchevich | 364/424.051 |
| 5,711,023 | 1/1998 | Eckert | 701/70 |
| 5,711,024 | 1/1998 | Wanke | 701/82 |
| 5,722,743 | 3/1998 | Sano | 303/146 |
| 5,732,379 | 3/1998 | Eckert et al. | 701/183 |
| 5,742,507 | 4/1998 | Eckert | 364/426.01 |
| 5,762,406 | 6/1998 | Yasui et al. | 303/146 |

OTHER PUBLICATIONS

"Toyota Soarer", pp. 3–54 to 3–59, issued in May 1991.

*Primary Examiner*—William M. Shoop, Jr.
*Assistant Examiner*—Rita Leykin
*Attorney, Agent, or Firm*—Burns, Doane, Swecker & Mathis, LLP

[57] ABSTRACT

The present invention is directed to a vehicle motion control system for maintaining vehicle stability, even in the case where the vehicle is tilted when the vehicle is in turning motion, wherein a braking force control unit is provided for controlling a braking force applied to each of front and rear wheels of the vehicle. The system includes a tilt detection unit which detects a tilt of a normal axis of the vehicle to its vertical axis, and a turn determination unit which determines a turning condition of the vehicle including a turning direction thereof. A yaw moment control unit is provided for controlling the braking force controlling unit to produce a yaw moment in a direction opposite to the turning direction of the vehicle in response to the tilt detected by the tilt detection unit when the turn determination unit determines that the vehicle is turning.

8 Claims, 9 Drawing Sheets

VEHICLE MOTION CONTROL SYSTEM

BACKGROUND OF THE INVENTION

1. Field of the Invention

The present invention relates to a vehicle motion control system for controlling motion of a vehicle in accordance with a tilt of the vehicle when the vehicle is in turning motion.

2. Description of the Related Arts

Recently, a vehicle is provided with an active control suspension system which automatically controls the vehicle's position and comfort. The active control suspension system is adapted to control a hydraulic pressure responsive actuator operatively mounted on each wheel of the vehicle, in response to a driving condition of the vehicle, a road condition and so on, as disclosed for example in a shop manual for a Japanese automobile "Toyota Soarer", issued in May 1991, on pages 3-54 to 3-59.

According to the active control suspension system, the vehicle's position control is performed by determining the vehicle's position on the basis of output signals of various sensors, and controlling pressure control valves so as to keep the vehicle's position substantially stable in any driving conditions. For example, when the vehicle is in turning motion, an anti-roll control is performed by operating an actuator for controlling right and left pressure cylinders, in response to a lateral acceleration of the vehicle which is detected by a lateral acceleration sensor. Consequently, the turning motion of the vehicle is made in such a stable condition that the vehicle's position is kept substantially horizontal.

According to the above-described active control suspension system, however, the actuator and the pressure cylinder controlled thereby are to be provided for each wheel, and the control system will be complicated. Comparing with conventional suspension systems, therefore, number of parts needed for the active control suspension system will be increased, and the system as a whole will become large in scale and high in cost.

SUMMARY OF THE INVENTION

Accordingly, it is an object of the present invention to provide a vehicle motion control system for use in a vehicle having a conventional suspension system, wherein the vehicle motion can be controlled appropriately even in the case where the vehicle is tilted when the vehicle is in turning motion.

In accomplishing the above and other objects, a vehicle motion control system is provided for maintaining stability of an automotive vehicle when the vehicle is in turning motion, which includes a braking force control unit for controlling the braking force applied to each of front and rear wheels of the vehicle, a tilt detection unit for detecting a tilt of a normal axis of the vehicle to its vertical axis, and a turn determination unit for determining a turning condition of the vehicle including a turning direction thereof. The system further includes a yaw moment control unit which controls the braking force controlling unit to produce a yaw moment in a direction opposite to the turning direction of the vehicle in response to the tilt detected by the tilt detection unit when the turn determination unit determines that the vehicle is turning.

The yaw moment control unit may be adapted to select one of the front wheels of the vehicle located on the outside of a curve in the vehicle's path of travel in accordance with the result of the turn determination unit, and adapted to control the braking force controlling unit to apply the braking force to the one of the front wheels located on the outside of the curve in the vehicle's path of travel in response to the tilt detected by the tilt detection unit.

Preferably, the system further includes a wheel speed detection unit for detecting a wheel speed of each wheel of the vehicle, and the yaw moment control unit includes a desired slip rate setting unit for setting a desired slip rate for each wheel of the vehicle in response to the tilt detected by the tilt detection unit, an actual slip rate measuring unit for measuring an actual slip rate of each wheel of the vehicle, and a slip rate deviation calculating unit for calculating a deviation between the desired slip rate and the actual slip rate. And, the yaw moment control unit may be adapted to control the braking force controlling unit in response to the deviation calculated by the slip rate deviation calculating unit.

The system may further comprise a driving force controlling unit for controlling a driving force applied to the vehicle, and a speed decreasing unit for controlling at least one of the braking force controlling unit and the driving force controlling unit to decrease a speed of the vehicle in response to the tilt detected by the tilt detection unit when the turn determination unit determines that the vehicle is turning. The yaw moment control unit may be adapted to select one of the front wheels of the vehicle located on the outside of the curve in the vehicle's path of travel in accordance with the result of the turn determination unit, and adapted to control the braking force controlling unit to apply the braking force to the one of the front wheels located on the outside of the curve in the vehicle's path of travel in response to the tilt detected by the tilt detection unit.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
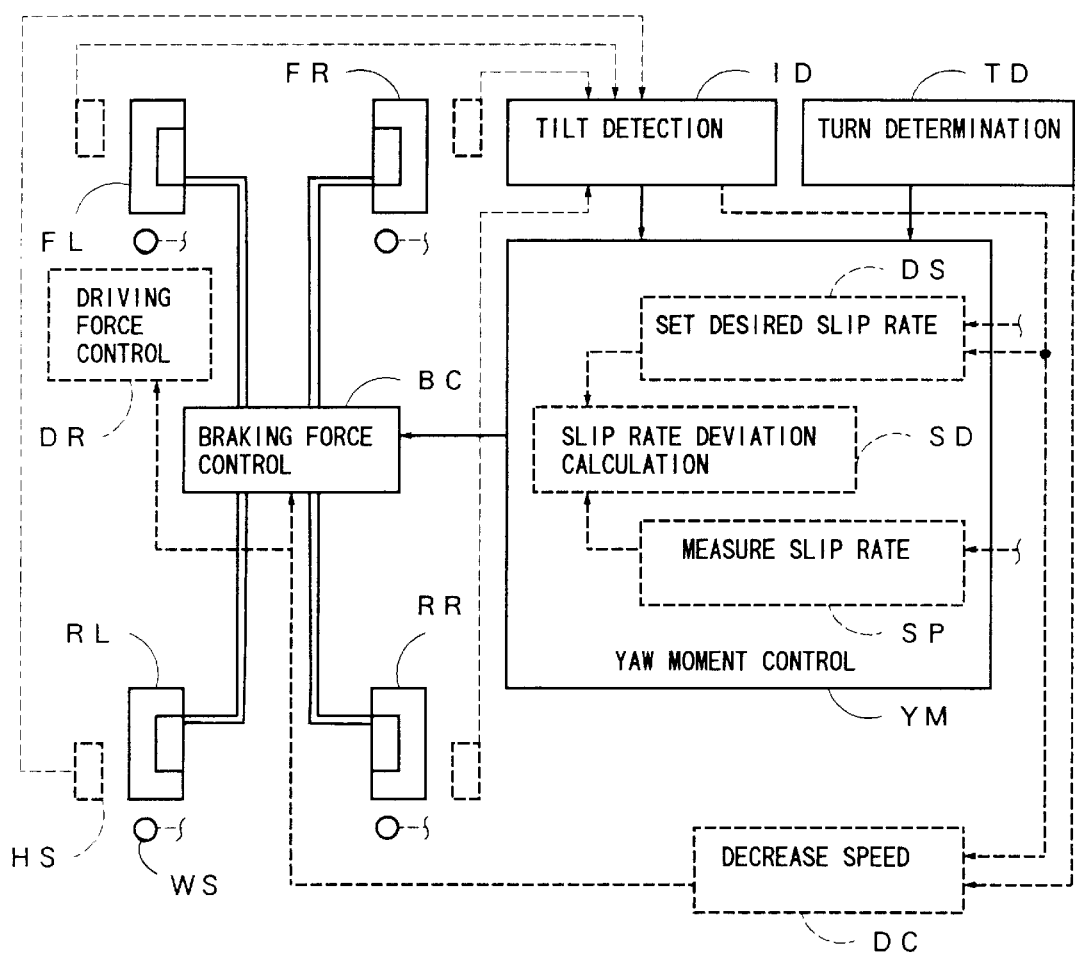
FIG. 1 is a general block diagram illustrating a vehicle motion control system according to an embodiment of the present invention.

Referring to FIG. 1, there is schematically illustrated a vehicle motion control system according to an embodiment of the present invention, wherein a braking force controlling unit BC is provided for controlling a braking force applied to each of front wheels FL, FR and rear wheels RL, RR of a vehicle. The system includes a tilt detection unit ID which detects a tilt of a normal axis of the vehicle to its vertical axis, or a inclination of the vehicle, and a turn determination unit TD which determines a turning condition of the vehicle including its turning direction thereof. A yaw moment control unit YM is provided for controlling the braking force controlling unit BC to produce a yaw moment in a direction opposite to the turning direction of the vehicle in response to the tilt detected by the tilt detection unit ID when the turn determination unit TD determines that the vehicle is turning. The yaw moment control unit YM may be adapted to select one of the front wheels FL, FR located on the outside of a curve in the vehicle's path of travel in accordance with the result of the turn determination unit, and adapted to control the braking force controlling unit BC to apply the braking force to the one of the front wheels FL, FR located on the outside of the curve in the vehicle's path of travel in response to the tilt detected by the tilt detection unit ID. As for the tilt detection unit ID, vehicle height sensors may be employed, and a yaw rate sensor and the like may be used for the turn determination unit TD.

The vehicle motion control system may further include wheel speed sensors WS each of which detects a wheel speed of each wheel of the vehicle. Then, as illustrated by broken lines in FIG. 1, the yaw moment control unit YM may include a desired slip rate setting unit DS for setting a desired slip rate for each wheel of the vehicle in response to the tilt detected by the tilt detection unit ID, an actual slip rate measuring unit SP for measuring an actual slip rate of each wheel of the vehicle, and a slip rate deviation calculating unit SD for calculating a deviation between the desired slip rate and the actual slip rate, so that the yaw moment control unit YM is adapted to control the braking force controlling unit BC in response to the deviation calculated by the slip rate deviation calculating unit SD.

The vehicle motion control system may be constituted by the braking force controlling unit BC, the tilt detection unit ID, the turn determination unit TD, a driving force controlling unit DR for controlling a driving force applied to the vehicle, and a speed decreasing unit DC which controls the braking force controlling unit BC and/or the driving force controlling unit DR to decrease a speed of the vehicle in response to the tilt detected by the tilt detection unit ID when the turn determination unit TD determines that the vehicle is turning.

Figure 2:
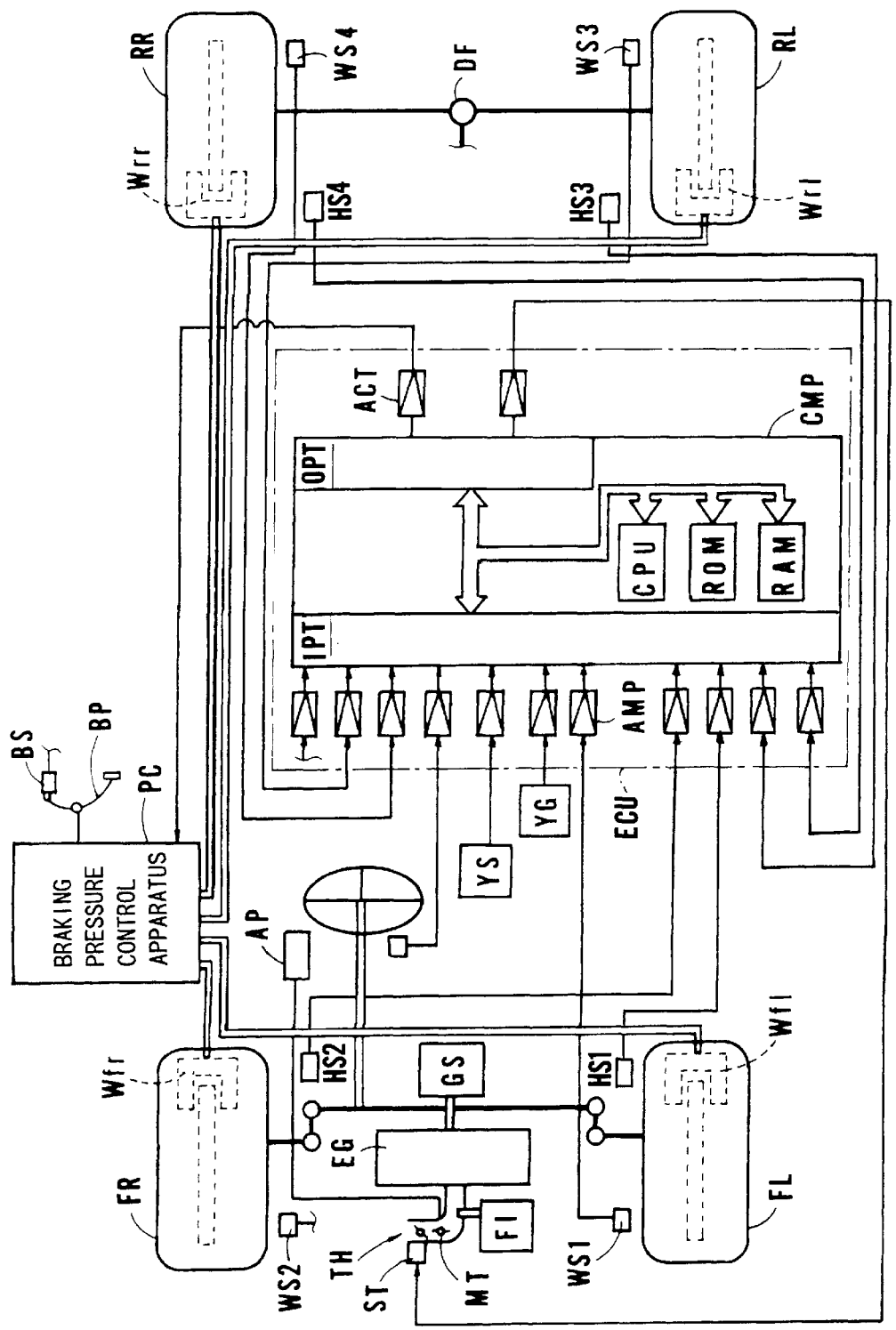
FIG. 2 is a schematic block diagram of a vehicle including the vehicle motion control system of the above embodiment.

More specifically, the details of the embodiment disclosed in FIG. 1 are illustrated in FIGS. 2 to 13. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 3:
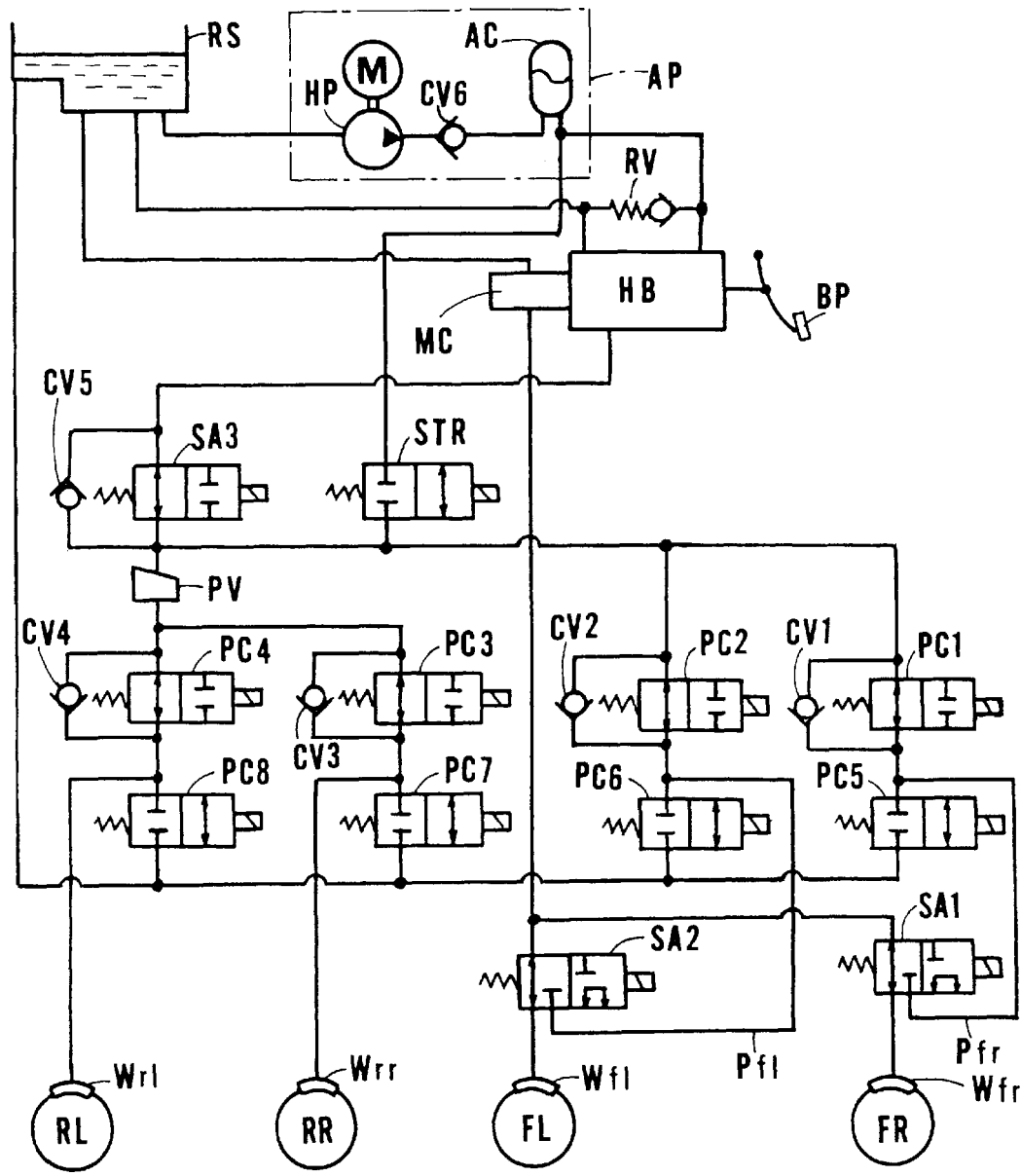
FIG. 3 is a block diagram illustrating an embodiment of a hydraulic braking pressure control apparatus for use in the above embodiment.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus PC. The pressure control apparatus PC in the present embodiment may be arranged as illustrated in FIG. 3 which will be explained later in detail.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. Height sensors HS1–HS4 are provided for the wheels, respectively, to detect a height of the vehicle from the ground at each wheel, and always output the detected signal to the electronic controller ECU.

There are also provided a brake switch BS which turns on when the brake pedal BP is depressed, and turns off is when the brake pedal BP is released, a front steering angle sensor SSf for detecting a steering angle $\delta f$ of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate r is detected and fed to the electronic controller ECU. The yaw rate $\gamma$ may be calculated on the basis of a wheel speed difference Vfd between the wheel speeds of non-driven wheels (wheel speeds VwFL, VwFR of the front wheels FL, FR in the present embodiment), i.e., VFD=VwFL–VwRR, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 4 to 8, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

FIG. 3 shows an embodiment of the hydraulic braking pressure control apparatus PC which includes a master cylinder MC and a hydraulic booster HB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, WFL, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wrl and etc., a solenoid valve SA3, solenoid valves PC1–PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 3 to form a front and rear dual circuit system according to the present embodiment, while a diagonal circuit system may be employed.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 3, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1–PC8 are controlled by the electronic controller ECU to provide various control modes for controlling the stability of the vehicle, such as the steering control by braking, anti-skid control, and other various control modes. For example, when it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. When it is determined that the excessive understeer occurs while a vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above-described oversteer restraining control and understeer restraining control as a whole may be called as a steering control by braking.

Accordingly, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized, the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the oversteer restraining control and/or the understeer restraining control can be performed, as noted previously.

Figure 4:
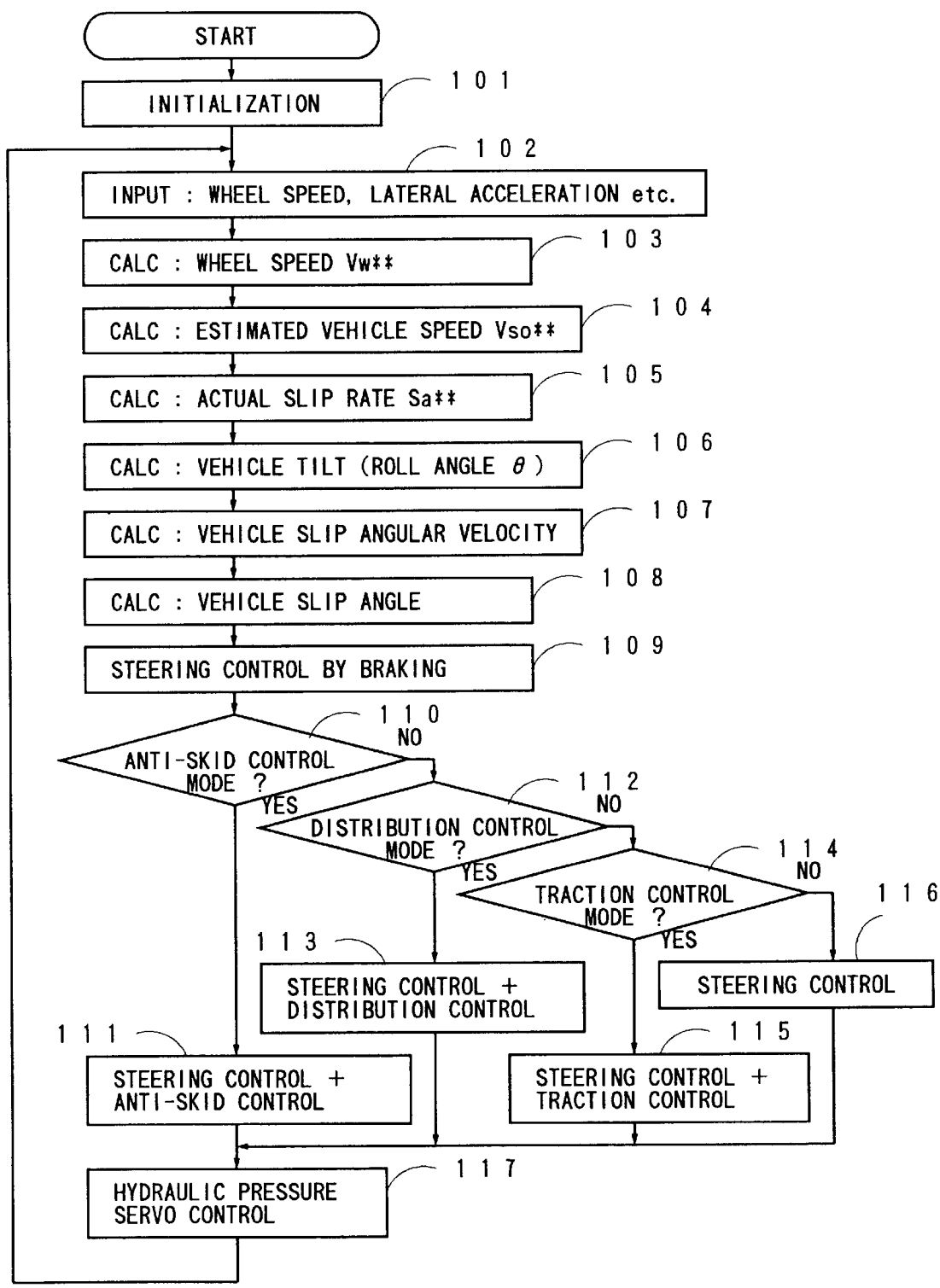
FIG. 4 is a flowchart showing a main routine of the vehicle motion control according to the above embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 8. The program routine starts when an ignition switch (not shown) is turned on. At the outset, the program for the vehicle motion control as shown in FIG. 4 provides for initialization of the system at Step 101 to clear various data. At Step 102, the signals detected by the wheel speed sensors WS1 to WS4 are read by the electronic controller ECU, and also read are the signal (steering angle δf) detected by the front steering angle sensor SSf, the signal (actual yaw rate γ) detected by the yaw rate sensor YS, the signal (actual lateral acceleration Gya) detected by the lateral acceleration sensor YG, and the signal (vehicle height HFL and so on) detected by the height sensors HS1–HS4.

Then, the program proceeds to Step 103 where the wheel speed Vw ( represents one of the wheels FL, FR, RL, RR) of each wheel is calculated, and the estimated vehicle speed Vso (=MAX[Vw]), an estimated vehicle speed Vso is calculated for each wheel, respectively, on the basis of the wheel speed Vw at Step 104. The estimated vehicle speed Vso may be normalized to reduce the error caused by a difference between the wheels located on the inside and outside of the curve while cornering. At Step 105, also calculated is an actual slip rate Sa on the basis of the wheel speed Vw for each wheel and the estimated vehicle speed Vso (or, the estimated and normalized vehicle speed NVso) which are calculated at Steps 103 and 104**, respectively, in accordance with the following equation:

$$Sa^{}=(Vso-Vw^{})/Vso$$

Furthermore, the estimated vehicle speed Vso obtained at Step 104 may be differentiated to provide a longitudinal vehicle acceleration DVso. On the basis of the vehicle acceleration DVso and the actual lateral acceleration Gya detected by the lateral acceleration sensor YG, the coefficient of friction $\mu^{}$ of each wheel against a road surface can be calculated in accordance with the following equation:

$$\mu^{} \approx (DVso^{2}+Gya^2)^{1/2}$$

In order to detect the coefficient of friction against the road surface, various methods may be employed other than the above method, such as a sensor for directly detecting the coefficient of friction against the road surface, for example.

The program proceeds to Step 106 where a roll angle θ is calculated to represent the vehicle tilt, which will be described later with reference to FIG. 5. Then, at Step 107, a vehicle slip angular velocity Dβ is calculated, and a vehicle slip angle β is calculated at Step 108. This vehicle slip angle β is an angle which corresponds to a vehicle slip against the vehicle's path of travel, and which can be estimated as follows. That is, at the outset, the vehicle slip angular velocity Dβ, which is a differentiated value of the vehicle slip angle β, is calculated at Step 107 in accordance with the following equation:

$$D\beta=Gy/Vso-\gamma$$

Then, the vehicle slip angle β is calculated at Step 108 in accordance with the following equation:

$$\beta=\int(Gy/Vso-\gamma)dt$$

where "Gy" is the lateral acceleration of the vehicle, "Vso" is the estimated vehicle speed of the vehicle measured at its gravity center, and "γ" is the yaw rate.

The vehicle slip angle β may be calculated in accordance with the following equation:

$$\beta=\tan^{-1}(Vy/Vx)$$

where "Vx" is a longitudinal vehicle speed, and "Vy" is a lateral vehicle speed.

Then, the program proceeds to Step 109 where an operation for the steering control by braking is made to provide a desired slip rate for use in the steering control by braking, wherein the braking force applied to each wheel is controlled at Step 117 through the hydraulic pressure servo control which will be explained later, so that the pressure control apparatus PC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 110, where it is determined whether the condition for initiating the anti-skid control is fulfilled or not. If it is determined that the condition is in the anti-skid control mode, the specific initial control is terminated immediately at Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, a control mode for performing only the steering control by braking is set at Step 116. On the basis of the control modes as set in the above, the hydraulic pressure servo control is performed at Step 117, and then the program returns to Step 102. In accordance with the control modes set at Steps 111, 113, 115, 116, the sub-throttle opening angle for the throttle control apparatus TH may be adjusted in response to the condition of the vehicle in motion, so that the output of the engine EG could be reduced to limit the driving force produced thereby.

According to the above-described anti-skid control mode, the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to prevent the driven wheel from slipping during the vehicle driving operation.

Figure 5:
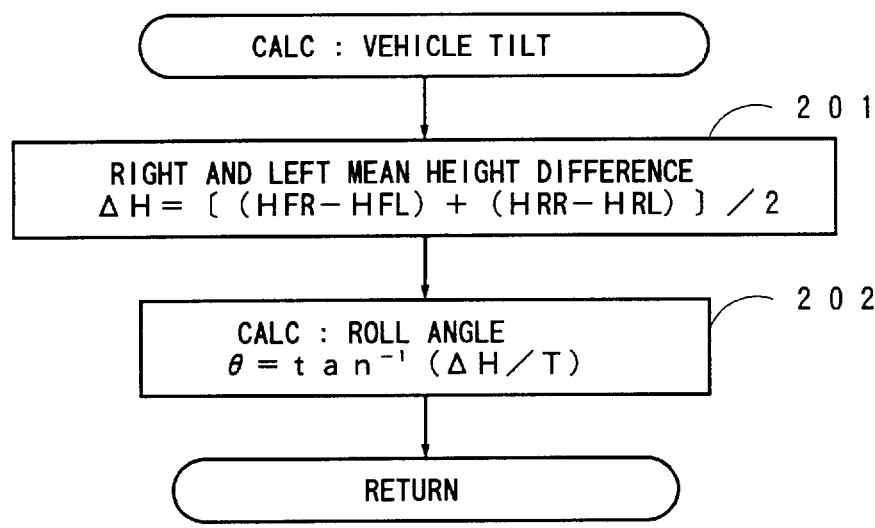
FIG. 5 is a flowchart showing a sub-routine of calculation of a vehicle tilt according to the above embodiment of the present invention.

FIG. 5 shows a flowchart for calculating the vehicle tilt (the roll angle θ) made at Step 106 in FIG. 4, wherein a mean value of the difference between the height at the right front wheel and the height at the left front wheel (UFR−HFL) and the difference between the height at the right rear wheel and the height at the left rear wheel (HRR−HRL) is calculated to provide a right and left mean height difference (ΔH) at Step 201. On the basis of the difference (ΔH), the roll angle θ indicative of the vehicle tilt is calculated at Step 202 in FIG. 5 in accordance with the following equation:

$$\theta \tan^{-1}(\Delta H/T)$$

where "T" indicates a tread.

Figure 6:
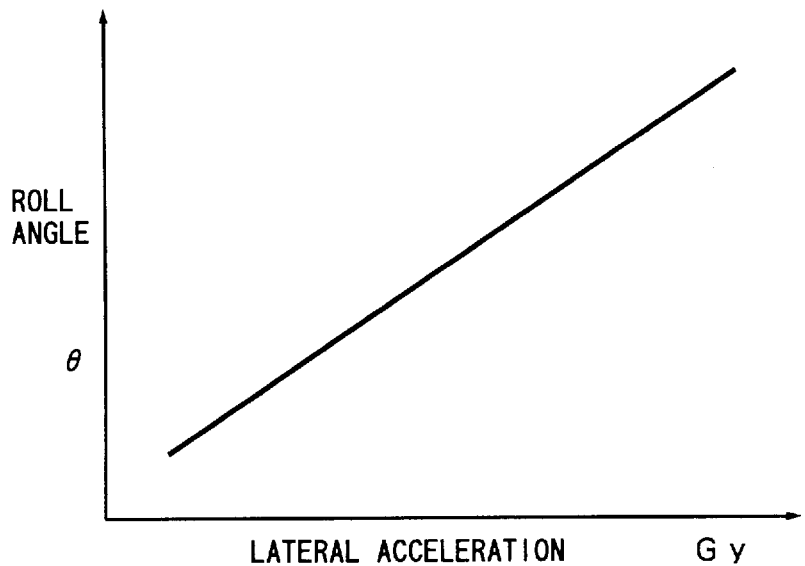
FIG. 6 is a diagram provided for another embodiment for calculating the vehicle tilt according to the above embodiment of the present invention.

Alternatively, the roll angle θ can be obtained on the basis of the lateral acceleration Gy, because there is a linearity between the lateral acceleration Gy and the vehicle tilt (the roll angle θ) as shown in FIG. 6. It may be so arranged that in advance of the calculation made at Step 201, it is determined by means of the yaw rate sensor YS, for example, whether the vehicle is in turning motion or not, and arranged that if it is determined that the vehicle is in turning motion, the program proceeds to Step 201, otherwise the program returns to the routine in FIG. 4.

Figure 7:
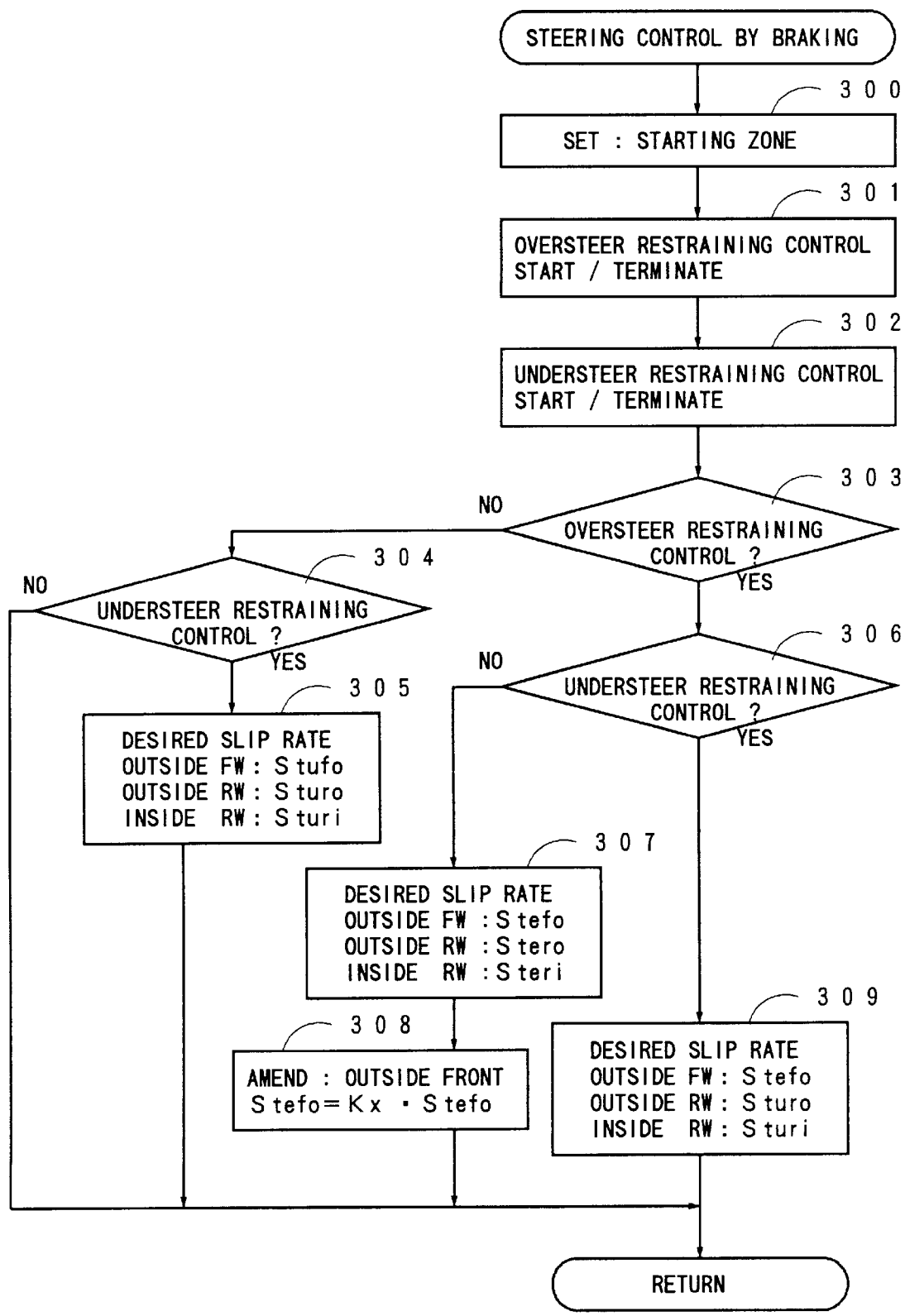
FIG. 7 is a flowchart showing a sub-routine of a steering control by braking according to the above embodiment of the present invention.
Figure 9:
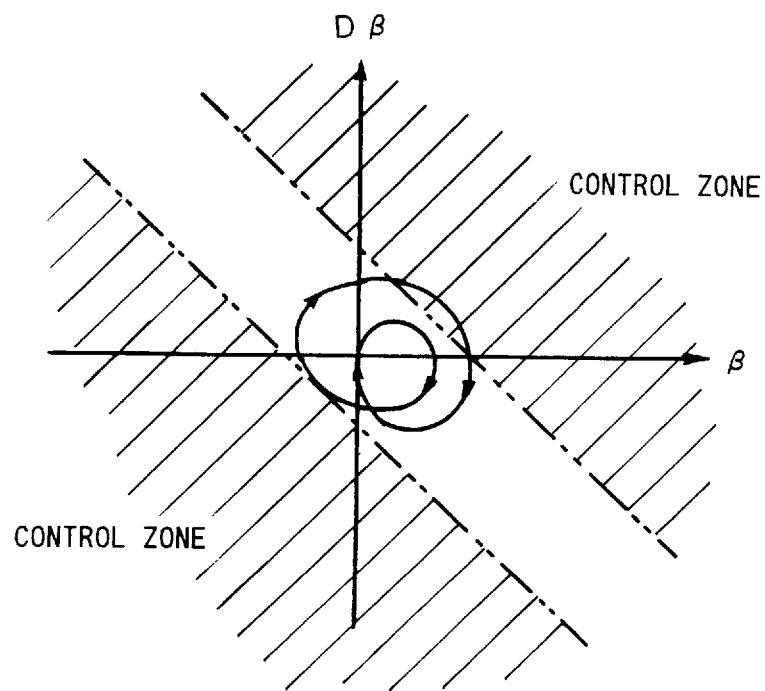
FIG. 9 is a diagram showing a region for determining start and termination of the oversteer restraining control according to above embodiment of the present invention.

FIG. 7 shows a flowchart for setting desired slip rates which are to be provided at Step 109 in FIG. 4 for the operation of the steering control by braking, which includes the oversteer restraining control and the understeer restraining control. Through this flowchart, therefore, the desired slip rates are set in accordance with the oversteer restraining control and/or the understeer restraining control. At the outset, a starting zone which will be explained later is set at Step 300. Then, it is determined at Step 301 whether the oversteer restraining control is to be started or terminated, and also determined at Step 302 whether the understeer restraining control is to be started or terminated. More specifically, the determination is made at Step 301 on the basis of the determination whether it is within a control zone indicated by hatching on a β−Dβ plane as shown in FIG. 9. That is, if the vehicle slip angle β and the vehicle slip angular velocity Dβ which are calculated when determining the start or termination, fall within the control zone, the oversteer restraining control will be started. However, if the vehicle slip angle β and the vehicle slip angular velocity Dβ come to be out of the control zone, the oversteer restraining control will be controlled as indicated by the arrow in FIG. 9 thereby to be terminated. Therefore, the boundary between the control zone and non-control zone (as indicted by two dotted chain line in FIG. 9) corresponds to the boundary of the starting zone which is set at Step 300, so that the position of the boundary is set in accordance with the roll angle θ. And, the braking force applied to each wheel is controlled in such a manner that the farther they are located remote from the boundary between the control zone and non-control zone (two dotted chain line in FIG. 9) toward the control zone, the more the amount to be controlled will be provided.

Figure 10:
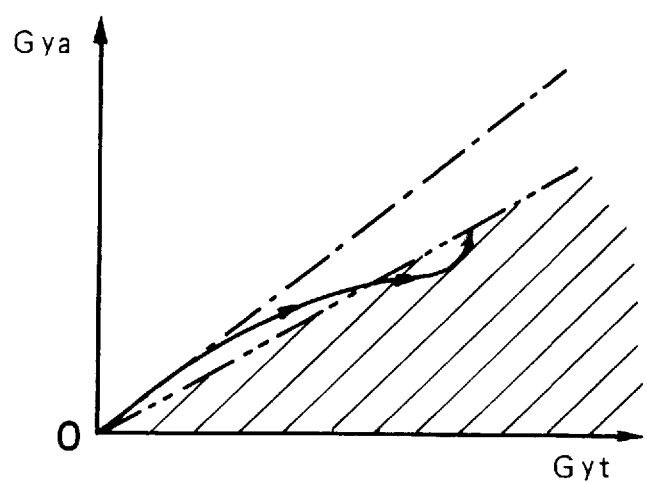
FIG. 10 is a diagram showing a region for determining start and termination of the understeer restraining control according to above embodiment of the present invention.

On the other hand, the determination of the start and termination is made at Step 302 on the basis of the determination whether it is within a control zone indicated by hatching in FIG. 10. That is, in accordance with the variation of the actual lateral acceleration Gya against a desired lateral acceleration Gyt, if they become out of the desired condition as indicated by one dotted chain line, and fall within the control zone, then the understeer restraining control will be started. If they come to be out of the zone, the understeer restraining control will be controlled as indicated by the arrow in FIG. 10 thereby to be terminated.

Then, the program proceeds to Step 303, where it is determined whether the oversteer restraining control is to be performed or not. If the oversteer restraining control is not to be performed, the program further proceeds to Step 304 where it is determined whether the understeer restraining control is to be performed or not. In the case where the understeer restraining control is not to be performed, the program returns to the main routine. In the case where it is determined at Step 304 that the understeer restraining control is to be performed, the program proceeds to Step 305 where the desired slip rate of each wheel is set to a desired slip rate which is provided for use in the understeer restraining control. If it is determined at Step 303 that the oversteer restraining control is to be performed, the program proceeds to Step 306 where it is determined whether the understeer restraining control is to be performed or not. In the case where the understeer restraining control is not to be performed, the program proceeds to Step 307 where the desired slip rate of each wheel is set to a desired slip rate which is provided for use in the oversteer restraining control. In the case where it is determined at Step 306 that the understeer restraining control is to be performed, the program proceeds to Step 309 where the desired slip rate of each wheel is set to a desired slip rate which is provided for use in both of the oversteer restraining control and the understeer restraining control.

With respect to the desired slip rate for use in the oversteer restraining control set at Step 307, the vehicle slip angle β and the vehicle slip angular velocity Dβ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$Gyt=\gamma(\theta f) \cdot Vso;$ $\gamma(\theta f)=(\theta f/N \cdot L) \cdot Vso/(1+Kh \cdot Vso^2)$ where "Kh" is a stability factor, "N" is a steering gear ratio, and "L" is a wheelbase of the vehicle.

At Step 305, the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured actual value indicated by "a". Then, "u" indicates the understeer restraining control, "r" indicates the rear wheel, "o" indicates the outside of the curve, and "i" indicates the inside of the curve, respectively. At Step 307, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control. "FW" indicates a front wheel and "RW" indicates a rear wheel.

Figure 13:
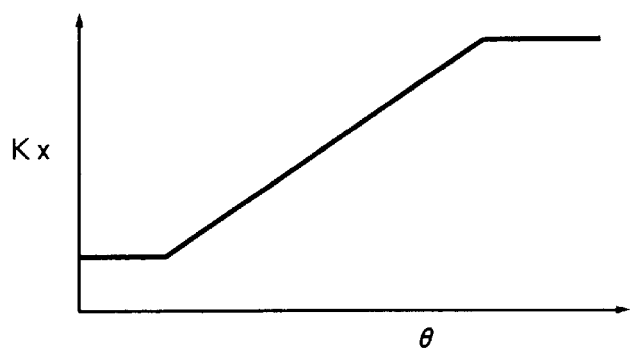
FIG. 13 is a diagram showing the relationship between the vehicle tilt and a gain for correcting a desired slip rate for a front wheel located outside of the curve in the vehicle's path of travel.

Then, the program proceeds from Step 307 to Step 308 where the desired slip rate "Stefo" which is set at Step 307 for the front wheel located on the outside of the curve is multiplied by a gain "Kx" to provide a new desired slip rate "Stefo". The gain "Kx" is set in response to the vehicle tilt (roll angle θ) so as to produce a predetermined yaw moment in a direction opposite to the turning direction of the vehicle, i.e., to comply with the relationship as shown in FIG. 13.

Whereas, at Step 309, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$Stefo=K1 \cdot \beta+K2 \cdot D\beta$ $Stero=K3 \cdot \beta+K4 \cdot D\beta$ $Steri=K5 \cdot \beta+K6 \cdot D\beta$ where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$Stufo=K7 \cdot \Delta Gy$ $Sturo=K8 \cdot \Delta Gy$ $Sturi=K9 \cdot \Delta Gy$ where K7 is a constant for providing the desired slip rate Stufo which is used for increasing the braking pressure (or, alternatively decreasing the braking pressure), while K8 and K9 are constants for providing the desired slip rates Sturo, Steri both of which are used for increasing the braking pressure.

Figure 8:
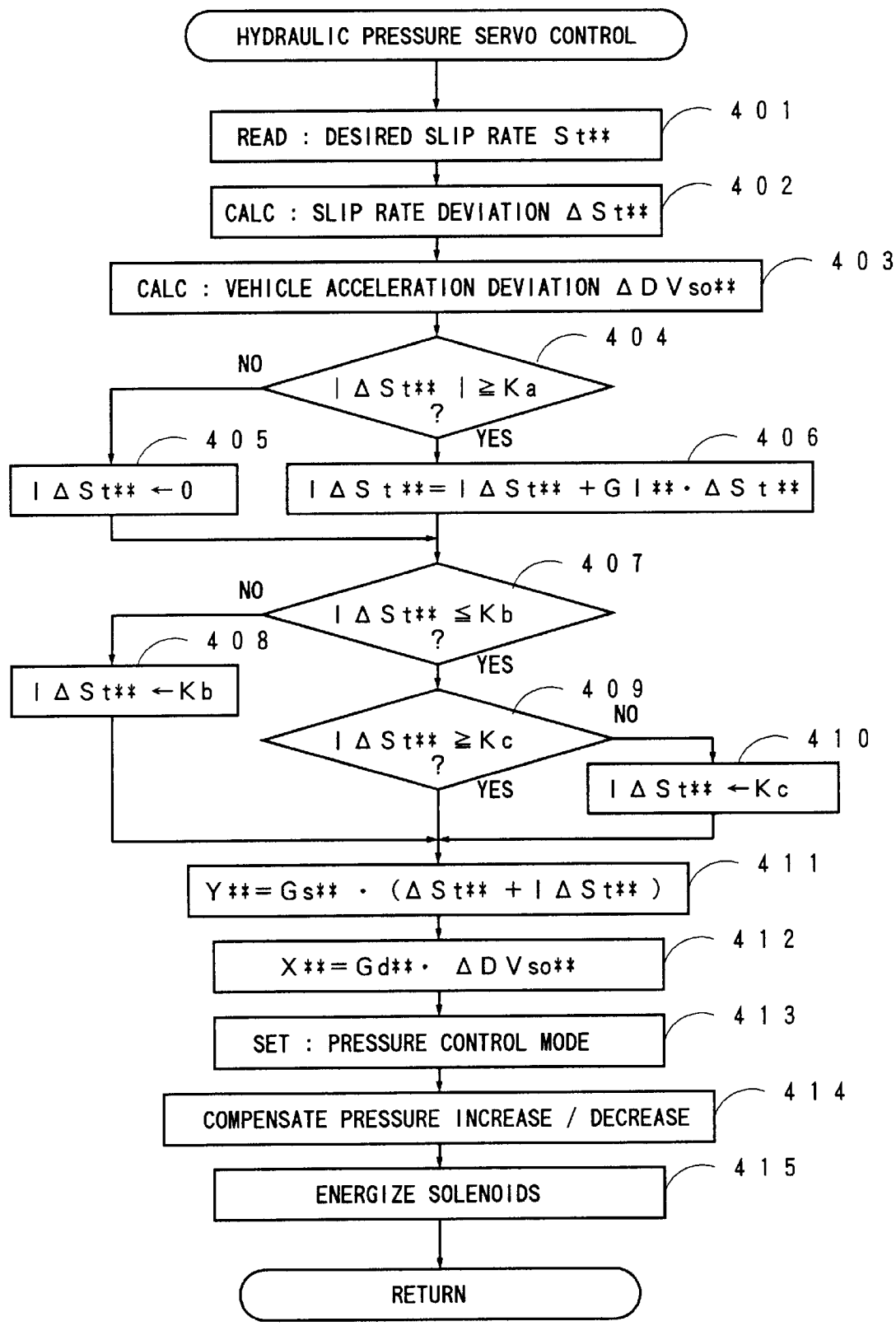
FIG. 8 is a flowchart showing a hydraulic pressure servo control according to the above embodiment of the present invention.

FIG. 8 shows the hydraulic pressure servo control which is executed at Step 117 in FIG. 4, and wherein the wheel cylinder pressure for each wheel is controlled through the slip rate servo control. At Step 401, the desired slip rates St, which are set at Step 305, 307, 308 or 309, are read to provide the desired slip rate for each wheel of the vehicle. Then, the program proceeds to Step 402 where a slip rate deviation ΔSt is calculated for each wheel, and further proceeds to Step 403 where a vehicle acceleration deviation ΔDVso is calculated. At Step 402, the difference between the desired slip rate St and the actual slip rate Sa is calculated to provide the slip rate deviation ΔSt (i.e., ΔSt=St−Sa). And, at Step 403, the difference between the vehicle acceleration DVso of a wheel to be controlled and that of a reference wheel (i.e., a wheel not to be controlled) is calculated to provide the vehicle acceleration deviation ΔDVso. The actual slip rate Sa and the vehicle acceleration deviation ΔDVso** may be calculated in accordance with a specific manner which is determined in dependence upon the control modes such as the anti-skid control mode, traction control mode, or the like.

Then, the program proceeds to Step 404 where the slip rate deviation ΔSt is compared with a predetermined value Ka. If an absolute value of the slip rate deviation |ΔSt| is equal to or greater than the predetermined value Ka, the program proceeds to Step 406 where an integrated value (IΔSt) of the slip rate deviation ΔSt is renewed. That is, a value of the slip rate deviation ΔSt multiplied by a gain GI is added to the integrated value of the slip rate deviation IΔSt obtained at the previous cycle of this routine to provide the integrated value of the slip rate deviation IΔSt at the present cycle. If the absolute value of the slip rate deviation |ΔSt| is smaller than the predetermined value Ka, the program proceeds to Step 405 where the integrated value of the slip rate deviation IΔSt is cleared to be zero (0). Then, the program proceeds to Steps 407 to 410 where the slip rate deviation IΔSt is limited to a value which is equal to or smaller than an upper limit value Kb, or which is equal to or greater than a lower limit value Kc. If the slip rate deviation IΔSt is greater than the upper limit Kb, it is set to be the value Kb at Step 408, whereas if the slip rate deviation IΔSt** is smaller than the lower limit Kc, it is set to be the value Kc at Step 410.

Figure 11:
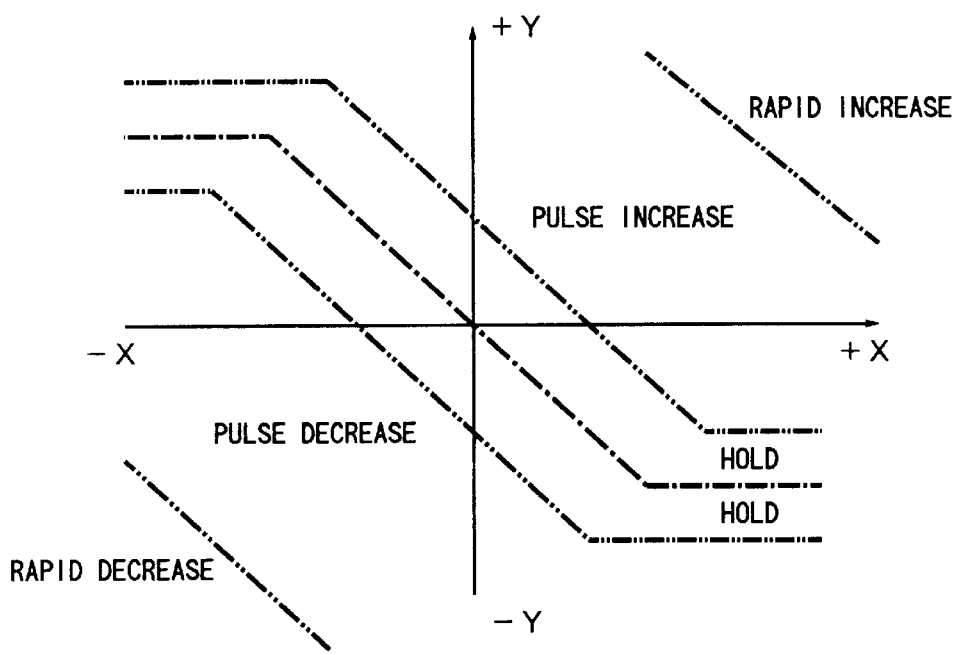
FIG. 11 is a diagram showing the relationship between the pressure control modes and parameters for use in the hydraulic braking pressure control according to the above embodiment.
Figure 12:
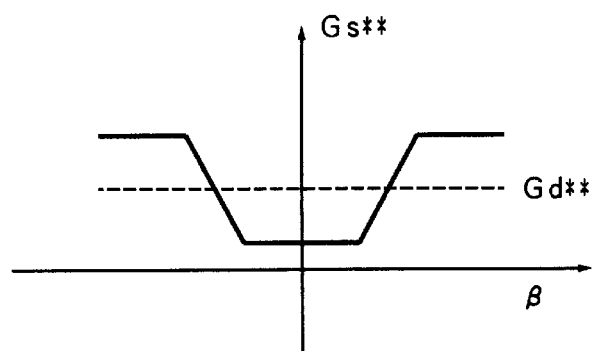
FIG. 12 is a diagram showing the relationship between a vehicle slip angle and a gain for calculating the parameters according to the above embodiment.

Thereafter, the program proceeds to Step 411 where a parameter Y** for providing a hydraulic pressure control in each control mode is calculated in accordance with the following equation:

$Y=Gs \cdot (\Delta St+I\Delta St)$ where "Gs" is a gain, which is provided in response to the vehicle slip angle β and in accordance with a diagram as shown by a solid line in FIG. 12. The program further proceeds to Step 412 where another parameter X is calculated in accordance with the following equation:

$$X^{}=Gd^{}\cdot \Delta DV_{SO}^{**}$$

where "Gd" is a gain which is a constant value as shown by a broken line in FIG. 12. On the basis of the parameters X and Y, a pressure control mode for each wheel is provided at Step 413, in accordance with a control map as shown in FIG. 11. The control map has a rapid pressure decreasing zone, a pulse pressure decreasing zone, a pressure holding zone, a pulse pressure increasing zone, and a rapid pressure increasing zone which are provided in advance as shown in FIG. 11, so that any one of the zones is selected in accordance with the parameters X and Y** at Step 413. In the case where no control mode is performed, no pressure control mode is provided (i.e., solenoids are off). At Step 414, is performed a pressure increase and decrease compensating control, which is required for smoothing the first transition and last transition of the hydraulic pressure, when the presently selected zone is changed from the previously selected zone at Step 413, e.g., from the pressure increasing zone to the pressure decreasing zone, or vice versa. When the zone is changed from the rapid pressure decreasing zone to the pulse pressure increasing zone, for instance, a rapid pressure increasing control is performed for a period which is determined on the basis of a period during which a rapid pressure decrease mode, which was provided immediately before the rapid pressure increasing control, lasted. Finally, the program proceeds to Step 415 where the solenoid of each valve in the hydraulic pressure control apparatus PC is energized or de-energized in accordance with the mode determined by the selected pressure control zone or the pressure increase and decrease compensating control thereby to control the braking force applied to each wheel.

According to the present embodiment, the steering control by braking is performed irrespective of depression of the brake pedal BP to provide the oversteer restraining control and/or the understeer restraining control. In addition, according to the present embodiment, the braking force is controlled so as to produce a yaw moment in a direction opposite to the turning direction of the vehicle, in response to the result detected by the height sensors HS1–HS4, so that a stable turning motion of the vehicle is ensured. As described before, the braking force is controlled in accordance with the slip rate in the present embodiment. As to a desired parameter for use in the oversteer restraining control and the understeer restraining control, however, any desired parameters corresponding to the braking force applied to each wheel, other than the slip rate, may be employed, such as the hydraulic pressure in each wheel brake cylinder, for example.

In contrast to the above-described embodiment wherein the braking force is controlled so as to produce a yaw moment in a direction opposite to the turning direction of the vehicle, in response to the result detected by the height sensors HS1–HS4, it may be so arranged that the braking force is controlled, and/or the driving force is controlled (by controlling the throttle control apparatus TH) so as to reduce the vehicle speed in response to the result detected by the height sensors HS1–HS4. Thus, with such vehicle speed reducing means provided, a stable turning motion of the vehicle can be performed by reducing the vehicle speed in response to the result detected by the height sensors HS1–HS4.

In lieu of the height sensors HS1–HS4, a tilt sensor for directly detecting the roll angle, such as a roll sensor may be employed for detecting the vehicle tilt. Or, the vehicle tilt can be estimated on the basis of the signals detected by the lateral acceleration sensor, so that the estimated result may be used for representing the vehicle tilt. Furthermore, the vehicle tilt can be estimated on the basis of a difference between a load applied to the wheel located inside of the curve in the vehicle's path of travel and the load applied to the wheel located outside of the curve in the vehicle's path of travel when the vehicle is in turning motion. The difference between those loads can be estimated on the basis of a pressure difference between a tire located inside of the curve in the vehicle's path of travel and another tire located outside of the curve in the vehicle's path of travel, or the wheel speed difference between the wheels located inside and outside of the curve in the vehicle's path of travel.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle is in a turning motion, comprising:

braking force controlling means for controlling a braking force applied to each of front wheels and rear wheels of said vehicle;

tilt detection means for detecting a tilt of a normal axis of said vehicle to a vertical axis of said vehicle;

turn determination means for determining a turning condition of said vehicle including a turning direction of said vehicle; and yaw moment control means for controlling said braking force controlling means to produce a yaw moment in a direction opposite to the turning direction of said vehicle in response to the tilt detected by said tilt detection means when said turn determination means determines that said vehicle is turning.

2. A vehicle motion control system as claimed in claim 1, wherein said yaw moment control means is adapted to select one of said front wheels of said vehicle located on the outside of a curve in said vehicle's path of travel in accordance with the result of said turn determination means, and adapted to control said braking force controlling means to apply the braking force to the one of said front wheels located on the outside of the curve in said vehicle's path of travel in response to the tilt detected by said tilt detection means.

3. A vehicle motion control system as claimed in claim 1, further comprising wheel speed detection means for detecting a wheel speed of each wheel of said vehicle, and wherein said yaw moment control means includes:

desired slip rate setting means for setting a desired slip rate for each wheel of said vehicle in response to the tilt detected by said tilt detection means;

actual slip rate measuring means for measuring an actual slip rate of each wheel of said vehicle; and slip rate deviation calculating means for calculating a deviation between the desired slip rate and the actual slip rate, said yaw moment control means controlling said braking force controlling means in response to the deviation calculated by said slip rate deviation calculating means.

4. A vehicle motion control system as claimed in claim 1, further comprising:

driving force controlling means for controlling a driving force applied to said vehicle; and speed decreasing means for controlling at least one of said braking force controlling means and said driving force controlling means to decrease a speed of said vehicle in response to the tilt detected by said tilt detection means when said turn determination means determines that said vehicle is turning.

5. A vehicle motion control system as claimed in claim 4, wherein said yaw moment control means is adapted to select one of said front wheels of said vehicle located on the outside of the curve in said vehicle's path of travel in accordance with the result of said turn determination means, and adapted to control said braking force controlling means to apply the braking force to the one of said front wheels located on the outside of the curve in said vehicle's path of travel in response to the tilt detected by said tilt detection means.

6. A vehicle motion control system as claimed in claim 4, further comprising wheel speed detection means for detecting a wheel speed of each wheel of said vehicle, and wherein said yaw moment control means includes:

desired slip rate setting means for setting a desired slip rate for each wheel of said vehicle in response to the tilt detected by said tilt detection means;

actual slip rate measuring means for measuring an actual slip rate of each wheel of said vehicle; and slip rate deviation calculating means for calculating a deviation between the desired slip rate and the actual slip rate, said yaw moment control means controlling said braking force controlling means in response to the deviation calculated by said slip rate deviation calculating means.

7. A vehicle motion control system as claimed in claim 1, wherein said tilt detection means is adapted to detect the tilt of said vehicle on the basis of a roll angle about a longitudinal axis of said vehicle.

8. A vehicle motion control system for maintaining stability of an automotive vehicle when said vehicle is in a turning motion, comprising:

braking force controlling means for controlling the braking force applied to each wheel of said vehicle;

driving force controlling means for controlling a driving force applied to said vehicle;

tilt detection means for detecting a tilt of a normal axis of said vehicle to a vertical axis of said vehicle;

turn determination means for determining a turning condition of said vehicle including a turning direction of said vehicle; and speed decreasing means for controlling at least one of said braking force controlling means and said driving force controlling means to decrease a speed of said vehicle in response to the tilt detected by said tilt detection means when said turn determination means determines that said vehicle is turning.

* * * * *